United States Patent [19]

Eriksen

[11] 4,204,560

[45] May 27, 1980

[54] RELIEF VALVE FOR FLUID SYSTEMS

[75] Inventor: Harald S. Eriksen, Minneapolis, Minn.

[73] Assignee: Lear Siegler, Inc., Santa Monica, Calif.

[21] Appl. No.: 12,645

[22] Filed: Feb. 16, 1979

[51] Int. Cl.² .................................... F16K 31/363
[52] U.S. Cl. ................................ 137/508; 137/539
[58] Field of Search ............................... 137/508, 539

[56] References Cited

U.S. PATENT DOCUMENTS

| | | | |
|---|---|---|---|
| 2,451,586 | 10/1948 | Strid | 137/508 |
| 2,693,821 | 11/1954 | Cornelius | 137/508 |
| 2,845,088 | 7/1958 | Crausman | 137/508 |
| 3,100,446 | 8/1963 | Foster | 137/508 X |
| 3,417,878 | 12/1968 | Schonfelder | 137/508 X |
| 3,856,043 | 12/1974 | Feild | 137/508 |

Primary Examiner—Harold W. Weakley
Attorney, Agent, or Firm—Orrin M. Haugen; Thomas J. Nikolai

[57] ABSTRACT

A pressure relief valve for fluid systems which accommodates partial to complete bypass of fluid while maintaining working pressure in the system, the valve comprising a housing enclosing a chamber, with a portion of the chamber being moveable, and with an inlet and an outlet communicating with the chamber. A plunger assembly is mounted within the housing and adapted for reciprocatory motion between normal and bypass operational modes, the plunger assembly comprising a plunger body slidably received within the valve housing and having seal means about the periphery thereof for sealing engagement with the inner periphery of the housing. A first spring normally biases the moveable portion of the plunger body in a direction toward the valve inlet in opposition to inlet pressure. A ball-check is provided and ball-check unseating means are formed within the housing, the unseating means being adapted to engage and unseat the ball-check upon travel of the moveable portion of the plunger assembly away from the valve inlet in response to excessive inlet pressure for bypassing at least a portion of the system capacity through the valve chamber.

4 Claims, 5 Drawing Figures

RELIEF VALVE FOR FLUID SYSTEMS

BACKGROUND OF THE INVENTION

The present invention relates generally to an improved pressure relief valve for fluid systems, and more particularly to a pressure relief valve which will typically respond to bypass a portion of the system capacity when system pressures become modestly in excess of normal working pressures, while continuing to maintain the system at approximately the desired operational pressures. The structure is also designed to provide fail-safe operation in the event of failure of the spring member which controls the pressure at which the valve will commence bypass. The pressure relief valve of the present invention has particular utility in applications where several terminal nozzles are employed using random off-and-on conditions, with a single pressure source, thereby achieving anywhere from partial to complete bypass of fluid while maintaining a predetermined working pressure within the system.

Typically, pressure relief or bypass valves have been designed to achieve an objective which is to function in response to system pressures which are equal to or greater than normal design working pressures. However, pressure relief or bypass valves have normally been designed to respond only when working pressures are substantially in excess of design pressures, thereby permitting at least temporary overload to occur in the system. For example, pressure relief or bypass valves may normally function only upon occurrence of dangerous pressure surges. Even temporary overload or surge may, in certain instances, damage system components, particularly system seals, pump piston cups, or other of the less durable components present in most fluid or hydraulic systems. The pressure relief valve of the present invention is arranged to respond to pressures which are only in modest excess of the working pressures and to continue to maintain the design working pressure, thereby providing greater control over the conditions present in the system.

The improved pressure relief valve of the present invention is particularly designed for systems which have widely variable demands. Such systems are frequently encountered in pressure washer systems utilizing a single pressure source, with a variety of outlet nozzles which function either intermittently or randomly. Typically, one pressure source may be utilized to provide fluid pressure for several working stations, with the individual demand requirements for each station being determined by the nature of the working situation. For example, in a car wash installation, several stations may be serviced by the same pump, with the flow of automobiles through the system being both intermittent and random.

Operation of the pressure relief valve of the present invention is achieved through bypass of a selected quantity of fluid from the system through a bypass orifice. The bypass orifice is designed to have a size such that the pressure drop of the fluid passing through the orifice is equal to a reasonably small fraction of the total working pressure, such as, for example, 10% of the normal working pressure. Under these conditions, substantially normal working pressure is always maintained at the inlet to the pressure relief valve and to other portions of the system. As such, the system may be designed to bypass fluid when only 70% of the system is calling for fluid under pressure, with the balance in a no-demand situation.

SUMMARY OF THE INVENTION

Briefly, the pressure relief valve of the present invention comprises a valve body having a plunger disposed therewithin, the plunger being designed for reciprocatory motion within the body. Resilient means in the form of a spring is provided for normally biasing the plunger body toward the inlet port and in opposition to system pressure. A spring biased ball-check is provided within the plunger body, and is adapted to normally move with the plunger body while maintaining its seated disposition until a certain predetermined axial position is reached. At this predetermined position, the ball-check is unseated, being retained at its axial disposition, while the plunger body is free to continue to move away from the inlet port. A cage is provided which will unseat the ball-check upon movement of the plunger body a predetermined distance away from the inlet port in response to inlet pressures which exceed the system design pressure. Upon unseating of the ball-check, a flow channel is established between the inlet and outlet, thereby providing a bypass for at least a part of the system fluid. The design is such that the system does not suffer pressure surges upon actuation of the valve. The valve is designed to permit adjustment of response, with means being provided in the form of a thrust bearing for permitting ease of adjustment and elimination of any tendency toward binding during adjustment. Also, the design is such that the valve is insensitive to mounting orientation, thereby permitting the valve to be installed and operated in any desirable physical disposition.

Therefore, it is a primary object of the present invention to provide an improved pressure relief valve which is designed to bypass system fluid in response to system pressures which pressures may be only slightly in excess of design pressures, and thereby provide for fluid flow bypass while system pressure continues to be maintained at the design level.

It is yet a further object of the present invention to provide an improved pressure relief valve which is adapted to function in response to system pressures only slightly greater than design or working pressures, and wherein positive and self-cleaning means are provided for actuation or opening of the valve in response to such excessive pressures.

It is yet a further object of the present invention to provide an improved pressure relief valve which employs a valve housing having a plunger body disposed therewithin, with the plunger body having a ball-check and seat functionally coupled thereto, and with means being provided to unseat the ball-check when the plunger body has moved to a predetermined position in response to excessive pressures occurring within the system.

It is yet a further object of the present invention to provide an improved pressure relief valve which employs means for adjusting the response of the valve to system pressures, and wherein the adjustment may be accomplished without the typical tendency toward "binding" which frequently occurs in relative rotation of spring-biased components.

Other and further objects of the present invention will become apparent to those skilled in the art upon a study of the following specification, appended claims, and accompanying drawings.

DESCRIPTION OF THE PREFERRED EMBODIMENTS

Figure 1:
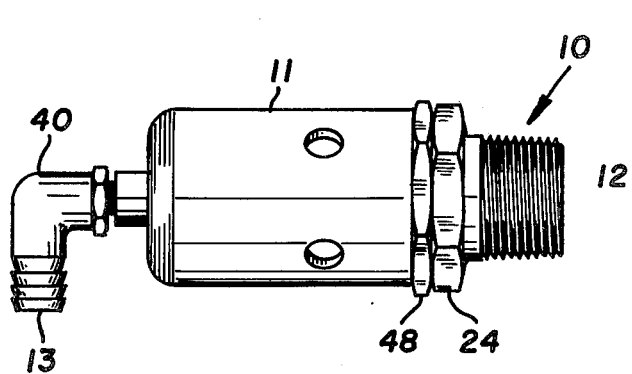
FIG. 1 is a side elevational view of one modification of the pressure relief valve of the present invention.
Figure 3:
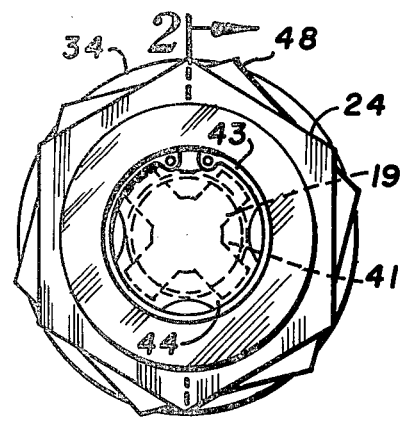
FIG. 3 is an end elevational view of the pressure relief valve of FIG. 1.
Figure 2:
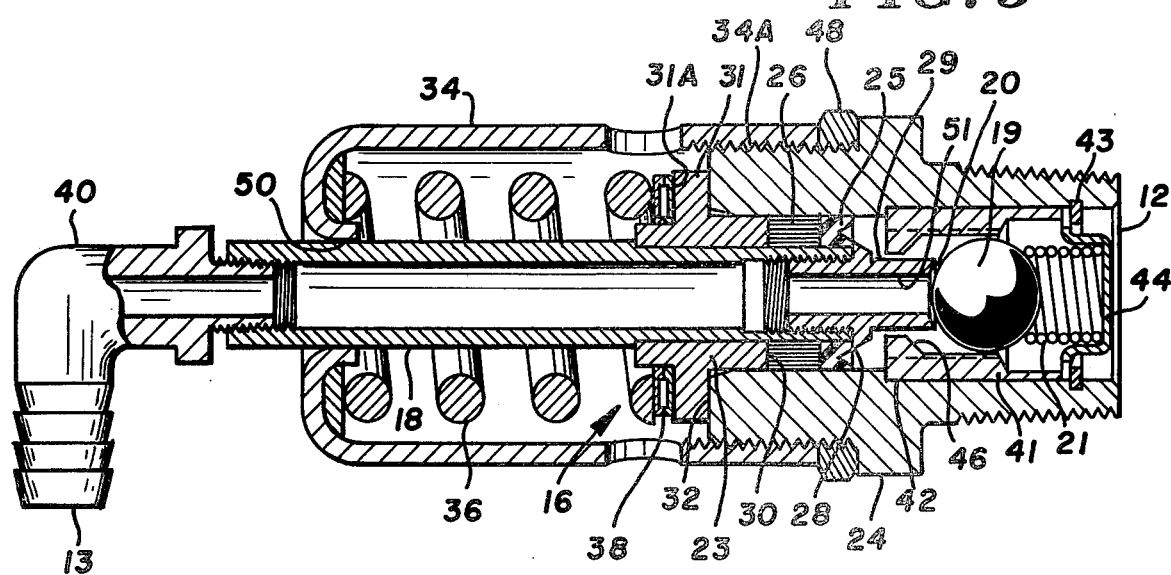
FIG. 2 is a sectional view taken along the line and in the direction of the arrows 2—2 of FIG. 3 and illustrating the ball-check in closed disposition.

In accordance with one preferred embodiment of the present invention, and with particular attention being directed to FIGS. 1-3 of the drawings, the pressure relief valve generally designated 10 comprises a body or housing 11 having an inlet 12 and an outlet 13. The valve 10 further includes a plunger assembly generally designated 16, with the plunger assembly being slidably received within the hollow core of housing 11. The details of the plunger assembly 16 are illustrated in detail in FIG. 2.

In normal operation, the valve 10 is disposed in a fluid system wherein the inlet 12 is coupled to the pressure source, such as the outlet of a pump in a fluid system operating under pressure, and with the outlet 13 of the valve 10 being coupled to a portion of the system which is normally not subject to pressure, such as the pump inlet, a reservoir, atmosphere, or the like.

With attention now being directed to FIG. 2 of the drawings, it will be observed that the body or housing 11 defines and contains a chamber, such as the chamber 18 in the form of a moveable conduit, with the chamber communicating, of course, with inlet 12 and outlet 13. Flow from inlet 12 through tubular chamber 18 and to outlet 13 is controlled by ball-check 19 which is normally seated upon seat 20, the operation of which will be described in greater detail hereinafter. Resilient spring means 21 is a light spring and normally biases ball-check 19 into seating contact with seat 20 under a modest seating force of approximately one pound. The only design constraint for spring 21 is that it does not achieve its solid height upon full movement of plunger 16 in a direction toward the right in FIG. 2 and will support the full vertical weight of the ball in its maximum leftward extension.

Figure 4:
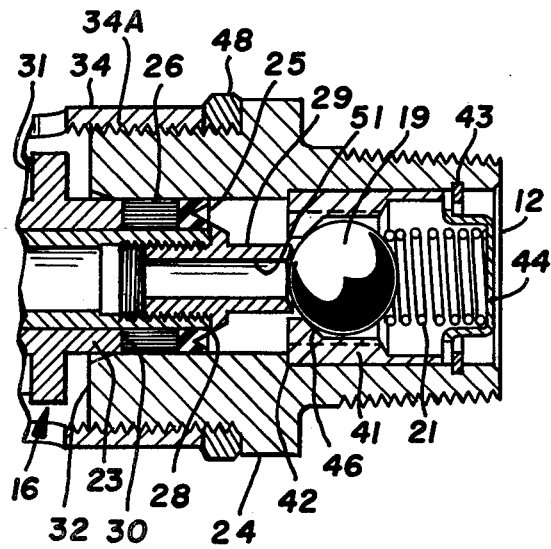
FIG. 4 is a sectional view similar to FIG. 2, but partially broken away, and illustrating the ball-check in an intermediate operational disposition, and with the valve being in normal operational mode.

As has been indicated, plunger assembly 16 is disposed within housing 11, with plunger assembly 16 being adapted for reciprocatory motion therewithin. As is apparent in the views of FIGS. 2 and 5, during operation, plunger assembly 16 may be disposed between normal and bypass operational modes, and ordinarily will be disposed at an intermediate disposition, generally just contacting abutment members 46—46, such as is illustrated in FIG. 4. Such a position would be assumed when the system pressure is at a desirable point, with virtually all of the working stations being provided with fluid under pressure.

Plunger assembly 16 comprises a generally cylindrical cup guide 23 which is slidably received within housing 11 and forming a support for the tubular chamber 18, specifically at least partially within outer sleeve 24 which functions as a guide retainer and spring support, as will be more fully described hereinafter, cup guide 23 having seal and guide means in the form of a seal 25 and guide 26, with guide 26 being disposed axially adjacent seal 25 and arranged to assist the retention of cup guide 23 in its reciprocatory travel. Typically, seal 25 is a cup-seal, while guide 26 is a graphite sleeve. In the embodiment illustrated in FIG. 2, the guide 26 and seal 25 are retained in place between the step 28 formed along sleeve member 29, and the end surface 30 of body 23. Also, body 23 is provided with a shoulder or abutment surface 31 normally disposed adjacent the complementary abutment surface 32 formed within outer sleeve 24. As is apparent in FIG. 2, housing 11 includes a cup-shaped sleeve body 34, with an internally threaded open end at 34A which is adapted to be threadably engaged with the end of outer sleeve 24, one with the other, as indicated in FIG. 2 for example. Seal 25 is utilized to seal the system from atmosphere, including the interior annular portion of sleeve body 34.

A first resilient means in the form of spring 36 is provided for normally biasing the plunger body in a direction toward the inlet 12. Spring 36 is preferably in the form of a spring having a substantial force, with the force of spring 36 being in substantial excess of that of spring 21 in order to accomplish operation of the system. Needle thrust bearing 38 is provided in order to reduce any tendency toward binding between spring 36 and outer sleeve 24, particularly between spring 36 and the abutment surface 31A.

In the normal operating mode, ball-check 19 remains seated on seat 20, and thus isolates inlet 12 from outlet 13. In the bypass position, however, with ball-check 19 unseated, fluid may flow from inlet 12 through orifices formed in members 18 and 29, thus providing for continued travel of bypass fluid through conduit 18 and ultimately through cap or elbow 40, thereby establishing a continuous flow channel from inlet 12 and thence outwardly through outlet 13.

With continued attention being directed to FIG. 2, it will be observed that ball-check 19 is normally retained within a cage formed within sleeve cage member 41. Sleeve cage 41 is retained in place against annular shoulder 42 of outer sleeve 24 by means of locking ring 43. Locking ring 43 is retained within a circumferential recess formed within outer sleeve 24. A cap member as illustrated at 44 is utilized to retain spring 21 in proper disposition, with cap 44 being provided, of course, with openings sufficient to accommodate fluid flow through the system. Additionally, cage sleeve 41 is provided with a plurality of radially spaced abutment members in the form of a spider, with the abutment members forming the spider being shown at 46—46 in FIGS. 2 and 3.

In order to control the pressure at which the valve permits bypass, a threaded attachment between cup-shaped sleeve body 34 and outer sleeve 24 is provided. A locking nut is provided in order to retain the system intact and in adjustment, with the locking nut being illustrated at 48. Thus, the operator may simply adjust the axial disposition of sleeve body 34 upon outer sleeve 24 and thus achieve a predetermined degree of compression in spring 36, thereby controlling the bypass pressure. Relative rotation between sleeve body 34 and outer sleeve 24 is rendered possible by needle thrust bearing 38, as previously indicated, thereby reducing any tendency toward binding or galling.

In order to control the axial reciprocatory motion of the plunger assembly, guide means are disposed at opposed ends of the plunger in the form of guide ring 26 and the inner periphery of sleeve 34, particularly within the circumferential guide surface 50. In this connection, therefore, smooth, predetermined and responsive reciprocatory axial motion may be achieved with the plunger 16 and associated conduit 18, thereby contributing to reliable valve performance. By way of operating parameters, the solid height of spring 36 along with the axial length of the balance of plunger 16 is selected so as to permit motion of the plunger which will permit opening of ball-check 19 upon axial motion of plunger 16. In this connection, the solid height of the spring 36 will not be reached prior to the point at which ball-check 19 engages abutment members 46—46 and becomes unseated.

OPERATING PARAMETERS

Figure 5:
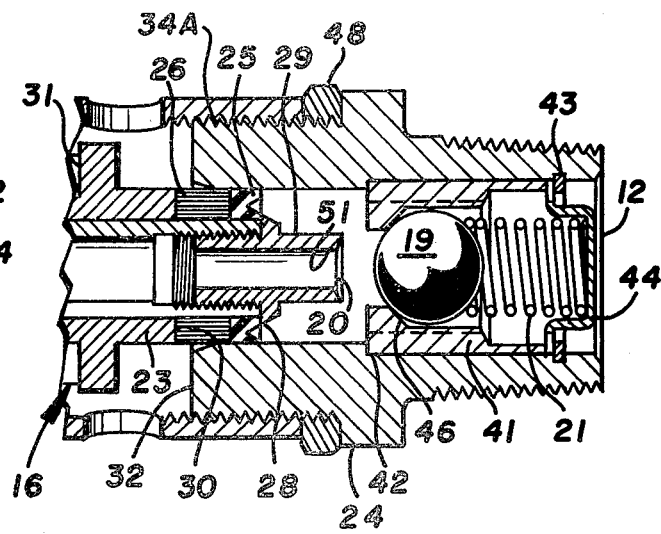
FIG. 5 is a sectional view similar to FIG. 4 and illustrating the ball-check in open disposition, and with the valve being in bypass mode.

Under normal operating conditions, wherein inlet 12 is subjected to working pressures, the plunger assembly 16 is free to float axially and accordingly may move axially to a point, such as is illustrated in FIG. 4. Equilibrium is established and under continuing operational conditions and parameters, plunger assembly 16 will remain disposed in substantially the floating disposition illustrated in FIG. 4. The normal operating position is with ball 19 in close proximity or contact with abutment 46—46. In operation, the spring force of spring member 36 in pounds is equal to the system pressure in p.s.i. multiplied by the total area in square inches of the plunger surface opposed to the incoming system pressure. In response to an increase in pressure in the operating system above the design pressure, plunger assembly 16 will move to the disposition illustrated in FIG. 5, with the abutment members 46—46 making contact with the surface of ball-check 19, and with sufficient force being generated by the pressure acting upon the plunger assembly 16, the plunger assembly 16 continues to move to the left from the disposition of FIG. 4 until the disposition of FIG. 5 is reached. At this point, ball-check 19 is unseated, thus relieving a certain portion of the force previously applied to plunger assembly 16, due to the loss of the effect of pressure otherwise acting on the area of the bore within the seat 20. This provides an equilibrium condition for the spring force of spring 36, becoming generally equal to the incoming system pressure multiplied by the annular area exposed to the system pressure. This annular area is determined by subtracting the area of the bore 41 from the total area of the plunger assembly 16 which is disposed in opposition to system pressure. This operational parameter and disposition will continue so long as the pressure exceeds the design pressure for the system, with ball-check 19 remaining unseated until the system pressure drops to a design level. Frequently this pressure drop is accomplished in the system by a modest decrease in system pressure generated by fluid flow of a portion of the capacity of the system through tubular chamber 18.

A system operating at equilibrium may be modified in either of two ways. The pressure in the system may be increased, or, adjustment of sleeve body 34 may be undertaken so as to either open or close ball-check 19. In the event the sleeve body 34 is adjusted to a position at which ball-check 19 is opened, system pressure will be at least partially relieved since some fluid will then be bypassed at a lower pressure, assuming, of course, that the shift in plunger position in response to the opening of ball-check 19 is not sufficiently great so as to permit ball-check 19 to again remain closed. In each operational change, plunger assembly 16 will respond by axial motion to a newly established operating disposition.

In other words, from a system exposed to only slight pressures, the plunger assembly will normally assume the disposition illustrated in FIG. 2, and upon being subjected to increase in inlet system pressure, the plunger assembly 16 will respond by a movement to the left, thereby compressing spring 36 until the spring force is equal to the system pressure multiplied by the plunger area. In the event system pressure is increased until plunger assembly 16 moves to a point where ball-check 19 is opened, ball-check 19 upon opening, will remain slightly open, thereby permitting a quantity of fluid to be bypassed therethrough. While ball-check 19 remains open, the forces operating on plunger assembly 16 are the spring force of spring 36 on one side, with the opposed pressure being obtained as the mathematical product of the system pressure times the area of the annulus. In this instance, the pressure applied to the annular area is the sum of the pressure applied at the inlet 12 plus that certain additional pressure drop occasioned by flow through the orifice, the orifice being defined as the flow space or channel existing between the surfaces of ball-check 19 and seat 20. The pressure applied is the increased pressure which is equal to the pressure drop across the orifice.

In normal operation, pressure increases above normal working pressures are tempered by virtue of the design parameters. Therefore, the total pressure in the system which is equal to the pressure drop through the orifice, may in certain instances, be higher than the design pressures. Therefore, the new pressure coupled with the decrease in area achieved with opening of the ball-check will frequently cause the plunger assembly to seek an intermediate operating disposition wherein the percentage of pressure increase over nominal will remain in the system generally equal to the percentage of area decrease. For production purposes, therefore, one may control the extent of over-pressure to which the system will be subjected by selection of the diameters of the plunger assembly and the orifice or bore 51.

EXAMPLE I

In establishing a design for a system capable of responding to an increase of 10% above design pressure (400 p.s.i.), the following is relevant:

Inasmuch as fluid flow contributes to pressure loss, a percentage of less than the 10% excess pressure must be selected such that the pressure drop through the valve seat (ball-check seat) will comprise only a portion of the selected excess pressure. For a design criterion as set forth above, a 6% area differential was selected, thus providing a 5/16th-inch diameter seat (area 0.0766 inch$^2$), thus $$0.0766/0.06 = 1.27 \text{ in.}^2$$

This provides a plunger having a diameter of approximately 1.25 inches. A 1.25 inch diameter plunger will have an area of 1.227 inch$^2$ which corresponds to substantially 6.25% area differential. This design would then provide approximately 25 p.s.i. over and above the normal 400 p.s.i. system pressure with approximately 15 p.s.i. pressure loss being added in other regions of constructed flow. The new equilibrium pressure would then be 440 p.s.i. In this design structure, a spring rate for spring 36 of 600 lb./in. was selected for low operating pressures, with 1600 lb./in. being selected for high pressures. Such spring selection has been found to provide reasonable operating parameters for system pressures of 400 p.s.i. and 1000 p.s.i. respectively.

The pressure relief valves of the present invention are adapted for a wide variety of applications, particularly car wash installations as well as in agricultural spraying systems where sectional booms are used, and for general purpose central cleaning stations where a number of independent terminal nozzles are being employed. Thus, the device is suited for application whether either partial to complete bypass of fluid is required while operating pressure is maintained within the system. The device protects systems from dangerous pressure surges which are normally inherent in the function of conventional pressure relief valves which are designed to maintain pressure in the system.

For materials of construction, it has been found that any suitable standard valve materials may be employed such as, for example, cast iron, wrought iron, or other metals suitable for the desired application. Also, standard packing and seal members as well as standard guide members may be employed.

I claim:

1. Pressure relief valve means for fluid systems and comprising, in combination, a valve housing enclosing a chamber with axially spaced inlet and outlet ports at spaced apart locations within said housing, annular stop means formed within said housing and being disposed between said inlet port and said outlet port, a plunger assembly disposed within said housing and being adapted for reciprocatory axial motion in first and second directions between normal and bypass operational modes respectively, and a ball-check member received within said plunger assembly and having spring means normally biasing said ball-check into contact with a seat formed in said plunger and disposed between said inlet and said outlet; said pressure relief valve means being characterized in that:

(a) said plunger assembly comprising a generally cylindrical plunger body slidably received within said housing and having seal means disposed about the periphery thereof isolating said inlet and outlet ports from atmosphere, and having conduit means coupling said ball-check seat to said outlet, and said plunger body mounted for reciprocatory motion within said housing and having radially extending shoulder means for engaging said annular stop means for limiting said reciprocatory motion in a first axial direction and positioning said plunger assembly within said housing in a first axial disposition;

(b) first resilient means normally biasing said plunger body toward said first disposition and toward said inlet to normally retain said plunger body with said shoulder means and said annular stop means substantially in engagement;

(c) said inlet port communicating with said ball-check seat, said ball-check member normally isolating the bore of said conduit means from said inlet port when said ball-check member is disposed in said seat; and (d) ball-check member caging means comprising a spider with a plurality of accurately spaced retaining legs extending radially inward from said housing and forming a stop for said ball-check for limiting movement from said inlet toward said outlet, and for lifting of said ball-check member from contact with said ball-check seat for flow of fluid from said inlet toward said outlet and past said ball-check seat upon predetermined travel of said plunger assembly axially away from said first disposition in said second direction in response to increases in inlet pressure, with said spring means maintaining a biasing force against said ball-check during the travel and positioning of said plunger assembly from said first disposition along said second direction to a second disposition.

2. The pressure relief valve as defined in claim 1 being particularly characterized in that said valve housing is provided with means for adjusting the axial length thereof, and wherein thrust bearing means are provided between said first resilient means and said plunger body.

3. The pressure relief valve as defined in claim 1 being particularly characterized in that said ball-check member caging means includes at least three accurately spaced retaining legs.

4. The pressure relief valve as defined in claim 1 being particularly characterized in that said valve housing includes guide means for reciprocatory movement of said conduit means.

* * * * *